Sept. 17, 1957 R. R. JOHNSON 2,806,994
RATIO AND PRODUCT METER
Filed Aug. 16, 1954 3 Sheets-Sheet 1

INVENTOR.
Robert R. Johnson.
BY
*Lippincott & Smith*
ATTORNEYS

Sept. 17, 1957 R. R. JOHNSON 2,806,994
RATIO AND PRODUCT METER
Filed Aug. 16, 1954 3 Sheets-Sheet 2

INVENTOR.
Robert R. Johnson.
BY
Lippincott & Smith
ATTORNEYS

Sept. 17, 1957 R. R. JOHNSON 2,806,994
RATIO AND PRODUCT METER
Filed Aug. 16, 1954 3 Sheets-Sheet 3

INVENTOR.
Robert R. Johnson.

ATTORNEYS

United States Patent Office 2,806,994
Patented Sept. 17, 1957

2,806,994

RATIO AND PRODUCT METER

Robert R. Johnson, San Carlos, Calif., assignor, by mesne assignments, to Textron Inc., Providence, R. I., a corporation of Rhode Island Application August 16, 1954, Serial No. 450,089

4 Claims. (Cl. 324—58)

This invention relates to apparatus for measuring either the ratio or the product of two radio frequency waves, more particularly of waves in the microwave spectrum. The most usual requirement for information as to the ratio of two radio frequency waves arises in the case of radio frequency transmission lines which must be matched in impedance to a load. Here it is often important to know the accuracy with which the match has been secured, as measured by either the reflection coefficient or the voltage-standing-wave-ratio in the line. In accordance with presently accepted terminology, this latter quantity will hereinafter be referred to as the "VSWR." The invention further relates to a self-contained instrument for measuring these quantities.

Among the objects of the invention are to provide apparatus wherein either the ratio or the product of two radio frequency waves can be immediately and accurately determined; to provide a device which is directly applicable to microwave measurements; to provide apparatus which can be quickly and accurately calibrated and whose accuracy is therefore independent of the exact characteristic of such items as tubes, so that in case of burn-outs or other failures of particular components replacements can be made promptly and with full confidence that measurements will not be affected by the change; to provide a self-contained meter for measuring the match between the transmission line and a load and one which may be calibrated to read directly in either VSWR or reflection coefficient; to provide apparatus of the class described which uses, as its sensitive elements readily available and reproducible components; to provide apparatus which, within the range for which it is designed, will give readings which are both linear and accurate to relatively close tolerances despite minor non-linearity in the components used; and to provide apparatus which, with its other advantages, is compact, rugged and economical.

The apparatus of the present invention comprises, broadly stated, a pair of bolometer elements which are supplied, respectively, with modulated radio frequency energy to be measured. The bolometers may be either of the barretter or thermistor type, although the former is preferred. Whatever type is used, the characteristic of a bolometer is that it changes in resistance with temperature. As herein used the bolometers are heated by the modulated radio frequency currents passing through them, and the type chosen must have a sufficiently rapid response so that their changes in temperature will follow to a reasonable degree the changes in amplitude due to the modulation of the radio waves to be compared, the percentage modulation being the same for both waves. A D. C. biasing potential is also applied to each bolometer. This biasing potential causes a current to flow, adding a constant component to the increment of resistance caused by the heating, but owing to the variation in resistance due to the modulation there is superimposed upon the biasing current an alternating component of the modulating frequency. As amplifier is provided for each bolometer, designed to pass the modulating components in their respective outputs. Each amplifier has a high and substantially constant gain. The output of one of the two amplifiers is detected, integrated, and the resulting direct component is applied to control the bias potential supplied to both amplifiers, thereby determining their output sensitivity. The output of the second amplifier is then applied to an indicator or meter to give the desired measurement. Whether the result is a ratio or a product depends upon the sense in which the bias potential applied across the two bolometers is varied by the output of the first rectifier. The sensitivity of a bolometer is a direct function of the bias potential; if the output of the first amplifier is so applied that the sensitivity of both bolometers is decreased by an increase in amplifier output, the meter supplied by the second amplifier gives a reading which is a function of the ratio of the two radio frequency waves, and if the variation in resistance of the bolometers due to the modulation component is small in comparison to that due to the biasing potential the response of the second amplifier is substantially in direct proportion to the power ratio of the two signals compared. If the variation in bias as supplied by the first amplifier is so poled as to increase the bias with the increasing signal, the reading supplied by the second amplifier will be proportional to the product of the signals compared.

In accordance with the invention as employed in a meter to measure reflection coefficient or VSWR, a section of transmission line is provided with two directional couplers, sensitive to radio-frequency waves traveling in opposite directions. This section of transmission line is connected in the line wherein the relationship is to be measured. Each of the two directional couplers feeds one of the bolometers, that which supplies the first or biasing amplifier being associated with the coupler directed to pick up the direct wave and the other with that picking up the reflected wave. The bias variation is applied negatively, so that an increase in output of the biasing amplifier decreases the bias and the bolometer sensitivity. The output of the second amplifier is then directly proportional to the power ratio of the two waves and the meter can therefore be calibrated either to read in terms of the reflection coefficient or of VSWR as may be desired.

All of the above will be clearer by reference to the detailed description of the invention which follows, when taken in connection with the accompanying drawings wherein.

Figure 1:
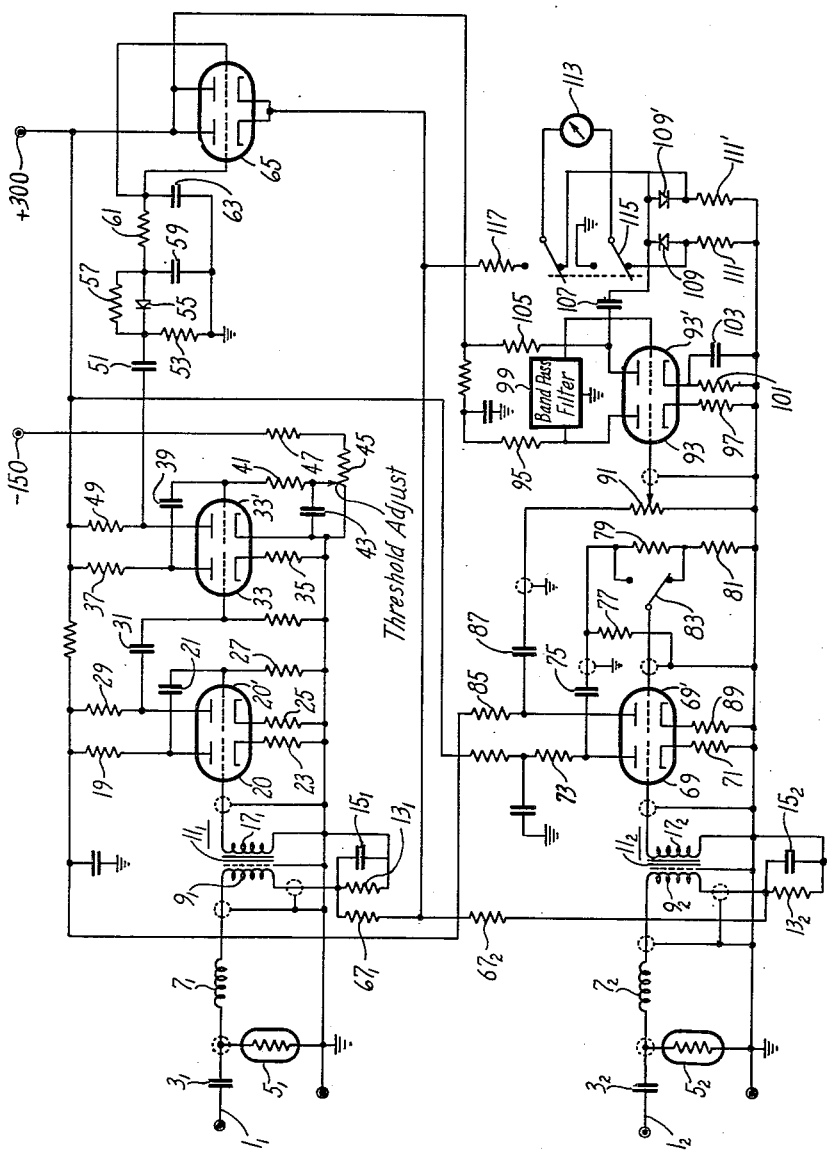
Fig. 1 is a schematic diagram of the circuits as employed in a preferred embodiment of the invention.

Considering first Fig. 1, there is shown at the left of the figure two radio frequency input lines $l_1$ and $l_2$. Connected to each line, through blocking condensers $3_1$, $3_2$, is a bolometer $5_1$, $5_2$. These constitute the two input circuits to the meter proper, and the circuits are shown in equivalent form; the actual connections utilized in a microwave form of the device will be described in detail hereinafter. The impedance of the bolometers must be reasonably accurately balanced to the impedance of the lines by which they are supplied; for the present it will merely be assumed that this is the case and one method by which it may be achieved will be discussed in the description to be given later.

One side of the transmission lines supplying the bolometers is illustrated as grounded, the bolometers connecting from the high side of the line to ground, and thus bridging or terminating the line.

Connected across each of the two lines is a low frequency circuit which, as illustrated, includes the equivalent of a high frequency choke $7_1$, $7_2$, so that the low frequency circuit offers a high impedance to the radio frequency or microwave voltage supplied to the bolometers but passes D. C. The low frequency circuit comprises two portions in series; one of these portions is illustrated as the primary coil $9_1$, $9_2$ of a transformer $11_1$, $11_2$ and is of relatively high impedance to the frequency of the A. C. modulating component of the waves to be measured, but is of low impedance to direct current. The second or biasing portion of each low frequency circuit is of relatively high D. C. but low A. C. impedance, comprising resistors $13_1$, $13_2$ shunted by large bypass condensers $15_1$, $15_2$. The values of all of these elements are relative, depending upon the operating parameters desired for the device. Illustratively, the bolometers $5_1$, $5_2$, may have cold resistances of about 115 ohms and operating resistances of approximately 200 ohms; the modulating frequency of the radio waves to be measured may be 1000 cycles. The input impedance of the transformers $11_1$, $11_2$, should therefore be at least 200 ohms at 1000 cycles, and may be much higher. Their D. C. impedance will, of course, be very much lower. The second, or biasing portions of the circuits may have a D. C. impedance of 1000 ohms, represented by the value of the resistors $13_1$, $13_2$, and an impedance at 1000 cycles of about 3 ohms, the condensers $15_1$, $15_2$ having capacities of 50 microfarads.

Up to the point described the two input circuits are substantially identical, but the amplifiers supplied by them differ materially in detail and will be described separately. Taking the first or biasing amplifier, the secondary coil $17_1$ of transformer $11_1$ connects from ground to the control electrode of a triode which is shown as one section 20 of a dual tube, although it could be a single unit tube. Preferably a high gain tube is used, that shown having a plate resistor 19, coupled through a blocking condenser 21 to the control electrode of a second section 20' of the dual triode. The cathodes of both sections connect to ground through biasing and feedback resistors 23 and 25, the section 20' being provided with the usual high-resistance grid resistor 27.

The tube section 20' is coupled through an anode resistor 29 and blocking condenser 31 with the grid of the first section 33 of a second dual tube, which is similarly resistance-capacitance coupled to the grid of the final amplifier section 33' of the dual tube. Like the tube sections 20, 20' the tube section 33 has a relatively high resistance, unbypassed, cathode resistor 35. The effective anode resistances of the first three tube sections may, for example, have values of approximately 45,000 ohms, whereas the cathode resistors have values of approximately 1000 ohms. Each stage therefore has a considerable negative feedback, reducing both distortion and gain. Nonetheless, using high mu triodes (e. g., 12AX7) the over-all voltage gain of the 4 stage amplifier is well over a half-million.

Tube section 33' differs from the preceding sections, being what has been variously termed a "delayed voltage amplifier" or a "threshold setting" or "threshold limiting" amplifier, its function being to amplify or pass on only the portion of the signals received by it which exceed a selected minimum amplitude. Its grid is coupled to the anode of section 33 through the usual coupling condenser 39 and grid resistor 41, the low potential end of which is bypassed to ground through a condenser 43. The low potential end of resistor 41, however, connects to the variable contact of a potentiometer 45, one end of which is grounded and the other end of which connects through a series resistor 47 to a source of negative biasing potential which may be in the neighborhood of 150 volts. In the particular equipment here described the potentiometer 45 has a resistance of 100,000 ohms and the resistor 47 a resistance of 56,000 ohms. The arrangement acts as a voltage divider wherein the grid bias may be set at any value between zero and approximately 100 volts negative. The signals passed by this tube section are therefore only such portion of the positive halves of the waves supplied to it as exceed the amount by which the grid is biased below cut-off. Above this point the amplification is substantially linear. By adjusting the amount by which the negative bias on the grid exceeds cut-off the strength of the minimum signal passed by the tube can be accurately set and the operating range of the instrument as a whole thereby established; only such portion of the signal as exceeds this minimum will appear in the output circuit of the amplifier.

Tube section 33' couples through plate resistor 49 and coupling condenser 51 to a peak detector, which in this case comprises a shunt resistor 53, connecting from condenser 51 to ground, a series rectifier 55 bridged by a resistor 57, followed by a shunt capacitor 59 connecting back to ground. Characteristic values for this network are 100,000 ohms for the resistor 53, 500,000 ohms for the resistor 57, and $\frac{1}{10}$ microfarad for capacitor 59.

The time-constant of this arrangement is sufficiently great so that the ripple in the rectified output of the detector is reduced to a very small value, and this residual ripple is further filtered through a resistor 61, of about 1 megohm, shunted by a 1 microfarad condenser 63 to ground. Resistor 61 connects to the two grids of a dual triode 65 in parallel.

The anodes and cathodes of tube 65 are also connected in parallel. The tube is connected as a cathode follower, the plates being connected directly to a source (not shown) of about 300 volts positive which supplies the anodes of all the tubes of both this and the second amplifier. The cathode circuits of the tube 65 connect back to the two bolometer-biasing circuits in parallel. As will be seen at the left of the diagram, the cathode lead from tube 65 divides through similar resistors $67_1$, $67_2$, which connect, respectively, through resistors $13_1$, $13_2$ to ground. The resistors $67_1$, $67_2$ have values of about 1500 ohms and serve to isolate the two biasing circuits from mutual effects due to the alternating component of the biasing current in the two input circuits.

In the more general useful function of the apparatus, where the result desired is the ratio of the two waves to be measured, the rectifier 55 is so poled that the grids of tubes 65 are driven negative by the rectified output of the amplifier. In operation, the operating bias for each of the bolometers is established by the portion of the cathode drop through resistors $13_1$, $13_2$, which are in parallel as viewed from the cathodes of the tube. When a signal is received which exceeds the threshold value set by tube section 33', the space current of the tube is decreased and so, accordingly, is the drop through the tube resistor $13_1$, $13_2$, and the bias on the two bolometers is accordingly and equally decreased, thereby decreasing their output. The cathode circuit of tube 65 therefore acts as a negative feedback loop. The very high gain of the amplifier makes extremely small proportional increases over the threshold or minimum signal set by the tube section 33 have a very large proportional effect on the bias voltage applied to the two bolometers. As the bias voltage enters into the equation for bolometer output as a direct factor, the sensitivity of the two bolometers vary together in the same proportion. Moreover, the sensitivity of bolometer $5_1$ is so varied that its amplitude of response is maintained at such value that after amplification it exceeds the minimum set by amplifier section 33' by only a small fraction of 1%, and the bolometer output is therefore substantially constant irrespective of the amplitude of the R. F. wave it detects. As the bias on bolometer $5_2$ varies in exactly the same proportion, the signal delivered to the second amplifier is inversely proportional to that delivered to the biasing amplifier and directly proportional to its own signal; i. e., it is proportional to the ratio of the two signals, as is desired.

Turning next to the second or meter amplifier, it is also a four stage, resistance-capacitance coupled amplifier, connected in the same general manner as the biasing amplifier. The signals from the bolometer $5_2$, are supplied by secondary coil $17_2$ to the grid of the first tube section 69, which has a 1000 ohm cathode unbypassed resistor 71 and a plate resistor 73, the latter being coupled to the following tube section through a coupling condenser 75. The input to tube section 59', however, differs from the arrangement in the biasing amplifier; its grid circuit comprises a shunt resistor 77, of (in the case described) 82,000 ohms in parallel with a resistance voltage-divider.

The grid of tube section 69' can be connected by a switch 83 across either the entire voltage divider or only its lower-resistance portion. The purpose of this arrangement is to give the meter two ranges, depending upon whether the entire signal or only a portion thereof is passed by the tube 69'. The latter tube section is also resistance-capacitance coupled to the succeeding amplifier stages, being provided with a 100,000 ohm plate resistor 85, coupled to the following stage through a condenser 87. Tube section 69' is also provided with an unbypassed, 1000 ohm cathode resistor 89. Condenser 87 connects to ground through a potentiometer 91, of 100,000 ohms value, the variable contact of which connects to the grid of succeeding stage 93. The potentiometer 91 is included to calibrate the meter by selecting the portion of the output of tube section 69' which is passed on to tube 93, but it will be noted that however the potentiometer may be set does not effect the ratio between the two settings of the switch 83.

Tube section 93 is similarly connected to the succeeding tube so far as its plate resistor 95 and unbiased cathode resistor 97 are concerned. It is coupled to the final amplification stage, however, through a bandpass filter 99, which passes the 1000 cycle modulating component but filters out noise developed in the system because of its high gain. It should be noted, however, that this is a refinement which is not necessary to the operation of the equipment, although it is desirable.

The final amplifier stage, comprising the tube section 93', has a cathode resistor 101 bypassed by a condenser 103, and a plate resistor 105 which feeds a full-wave rectifier through a coupling condenser 107. The rectifier comprises oppositely directed rectifying elements 109, 109' connected in parallel. Each rectifier element connects to ground, through equal resistors 111, 111'. A meter 113 connects through a switch 115 across the outputs of the rectifiers 109, 109'.

The readings of the meter when connected to the meter amplifier will then always be proportional to the power ratio of the two waves measured. When the device is used in a VSWR meter as will next be described, the meter can be connected to a load having a known degree of mismatch with the line which feeds it and the meter reading set to the proper value by the potentiometer 91. Thereafter the calibration is substantially constant. By throwing the switch in the opposite direction from that shown the meter is connected across the biasing circuits through a resistor 117 of 5600 ohms, becoming, in effect, a voltmeter by which the bias on the bolometers can be set at the recommended operating level with no signal present. Then, with the signal present, the threshold level is set by the potentiometer 45.

While the meter circuit which is illustrated is one which is very useful, it is by no means the only device which can be used for the purpose. It permits the employment of sensitive and accurate types of d'Arsonval meter, which are direct reading and uniformly sensitive throughout the scale. Nonetheless a properly designed A. C. meter could be used as an indicator, as could an oscilloscope or any other indicator. A D. C. meter, however, can be calibrated to read directly in either products or ratios, and if the device is used to measure ratios it can be calibrated to read in terms of reflection coefficient in terms of VSWR.

Figure 2:
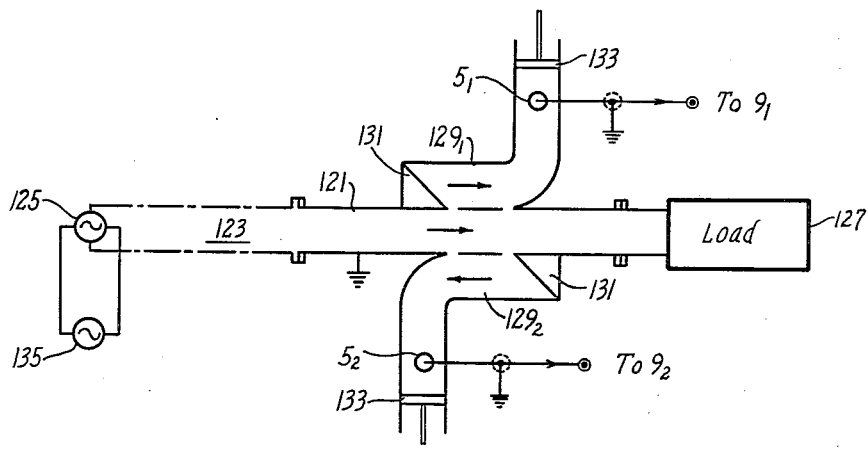
Fig. 2 illustrates a section of a wave guide transmission line, with two oppositely directed directional couplers, as utilized in the meter in accordance with the present invention.
Figure 5:
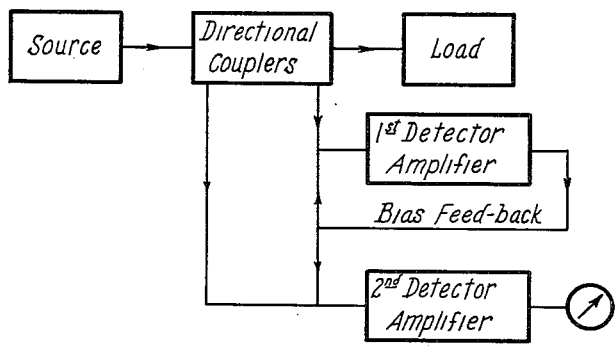
Fig. 5 is a block diagram of a reflection-coefficient VSWR meter of the invention.

As employed for measuring either of the latter two quantities, the invention includes additional apparatus illustrated schematically in Fig. 2, which shows apparatus for coupling the device into a wave guide. This includes a short, wave guide section 121, adapted to match a guide, generally indicated by the reference character 123, connecting a microwave generator 125 to a load 127, the match of which to the guide is to be determined. The section 121 should be connected as near to the load as possible, so that any attenuation of the reflected wave can be neglected.

Coupled to the section 121 are two, oppositely-directed directional couplers $129_1$ and $129_2$, the first so directed so as to respond to the direct waves from the generator while directional coupler $129_2$ responds to reflected waves from the load. The directional couplers shown are only one of several types which may be used, and comprise wave guides of similar characteristic to the principal guide and coupled to the latter by two holes substantially one-quarter wavelength apart at the frequency for which the device is constructed and intended to be used. The couplings through the two holes in either guide are equal, and a wave traveling along the guide in either direction excites similar, although much attenuated, waves in the coupler through each of the two holes. Each of the waves so excited travels in both directions, but the waves traveling in one direction are additive in effect while those traveling in the opposite direction substantially cancel, being out of phase. Resistive material 131 in the undesired direction of travel absorbs waves picked up from the undesired direction and prevents their reflection.

The bolometers $5_1$ and $5_2$ are mounted in their respective couplers, and the latter are terminated in extensions which may be tuned, by plungers 133, to match the impedance of the bolometers to that of the guides.

Ordinarily the source 125 will not be the actual power supply which is finally intended to excite the load, but a special oscillator, such as a klystron, which may be modulated by (in this case) a 1000 cycle source 135.

Figure 3:
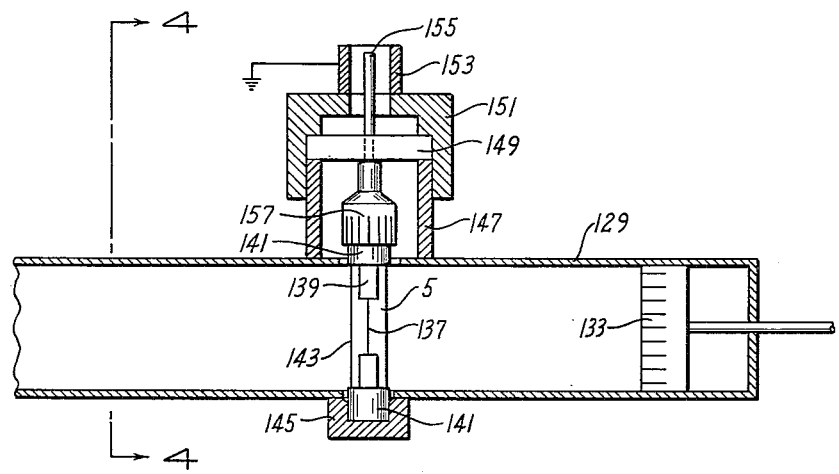
Fig. 3 is a cross-section of a wave guide having a bolometer mounting incorporated therein.
Figure 4:
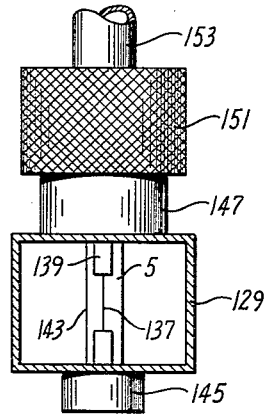
Fig. 4 is a plan view of the bolometer mounting illustrated in Fig. 2.

Figs. 3 and 4 show in longitudinal and cross-section respectively a mounting for the bolometers as used in the directional couplers $129_1$, $129_2$. The portion of the wave guide terminating the directional coupler is indicated by the character 129, and is shown as being the well known rectangular wave guide. It terminates in the shorting plunger 133, which was indicated schematically in Fig. 3. The bolometer 5 is mounted to span the short dimension of the guide, centrally of its longer cross-sectional dimension, a sufficient distance from the end of the stub to permit any tuning necessary to match the bolometer impedance to that of the guide.

The bolometer 5 comprises a length of extremely fine platinum wire 137. As usually constructed this is a Wollaston wire having, on the average, a diameter of about fifty-millionths of an inch. It is secured to larger terminal wires 139 which connect, in turn, to ferrules 141 mounted on the ends of a protecting tube 143 of low loss plastic, such as polystyrene. One available type of bolometer which answers this general description has a cold resistance of 115 ohms, approximately.

The lower ferrule 141 fits through a hole in the lower surface in the wave guide in a socket 145. The upper ferrule of the bolometer projects, through an orifice in the opposite face of the wave guide, into a cavity comprising a short length of tubing 147 capped by a button capacitor 149 which held in position on the tubing by a metallic cap 151, the cap connects to the grounded outer conductor 153 of a coaxial cable. The inner conductor 155 of the cable leads to the primary $9_1$ or $9_2$ of the low frequency circuit forming the input to the amplifier which is supplied by the device. Conductor 155 terminates in a clip 157 receiving the upper ferrule of the bolometer element.

The capacitor 149 is an effective short to the microwave carried by the wave guide, and terminates the cavity formed by the tube 147. The latter is approximately one-quarter wavelength long at the microwave frequency, and constitutes an effective high frequency choke in the leads of the low frequency circuit, corresponding to the chokes symbolically shown at $7_1$, $7_2$, blocking the microwave frequency from the amplifier while passing the 1000 cycle modulating component without attenuation.

Because of the extremely small volume of the platinum wire used in the bolometer of this, the barretter type, it will readily follow in its temperature and resistance variations the 1000 cycle variations in amplitude of the microwaves. The increments and decrements in the resistance of the bolometer wire are very small in comparison with the total resistance of the bolometer element, and are also small in comparison with the magnitude of the biasing current on which the operation of the bolometer depends. No material error has therefore been introduced by the fact that the bolometer is changing in resistance; the changes are so small that the impedance mismatches caused by them has no appreciable effect upon the output.

Investigation of barretters of the type prescribed has shown that their variation in resistance closely approximates the square of the applied voltage. The current which flows through the bolometer is inversely proportional to the resistance. Therefore the readings of the meter will be proportional to the power ratio of the two signals compared, which is the square of their voltage ratio and the meter must be calibrated accordingly.

The invention is not limited, as to detail, to the apparatus here shown. As has been pointed out above, the thermistor type of bolometer may be substituted for the barretters shown, without any material change except as to the bias normally supplied, while to provide a product instead of a ratio reading only the polarity of the final bias detectors has to be reversed. Substantially any type of high-gain amplifier may be used in either the biasing or metering channel. All intended limitations to the scope of the invention are expressed in the following claims.

I claim:

1. A VSWR meter for use in combination with a source of modulated radio frequency waves comprising a section of transmission line adapted for insertion in a line wherein a meaurement is to be made, a first directional coupler and a second directional coupler oppositely connected into said section to respond respectively to direct and reflected waves therein, a first and a second bolometer connected respectively in said first and second directional couplers, each of said bolometers having terminals for connection to a source of biasing potential, similar first and second circuits connecting across the said terminals of said first and second bolometers respectively, each comprising an A. C. coupling portion and a biasing portion in series, first and second amplifiers responsive to the modulating frequency of said waves connected to the A. C. coupling elements of said first and second circuits respectively, detector means connected to said first amplifier for developing from modulating-frequency signals supplied thereto a substantially constant direct voltage proportional thereto, connections for applying said direct voltage to the biasing portions of both of said first and second circuits to vary the biases on both of said bolometers concurrently, and metering means connected to the output of said second amplifier responsive to the magnitude of the modulating-frequency components developed therein.

2. A meter as defined in claim 1 wherein said metering means comprises a rectifier type detector and a D. C. meter connected to measure rectified current supplied thereby.

3. A meter as defined in claim 1 wherein said first amplifier includes means for preventing response of said detector means to signals of less than a selected amplitude and means for varying the minimum amplitude to which said detector means will respond.

4. Means for measuring the ratio or product of two modulated radio-frequency signals comprising a first and a second bolometer adapted to be coupled to respond respectively to the signals whose ratio is to be measured, a first and a second low-frequency circuit connected respectively across said first and second bolometers, each of said low-frequency circuits comprising a biasing portion having low A. C. and relatively high D. C. impedance and a portion in series therewith having low D. C. and relatively high A. C. impedance, a first and a second amplifier coupled respectively across the relatively high A. C. impedance portions of said low frequency circuits and responsive to the modulating frequencies of the signals to be measured, a detector connected to the output of said first amplifier, a meter connected to respond to the amplitude of signals supplied by said second amplifier, means for applying a D. C. biasing potential across the portion of said low frequency circuit having relatively high D. C. impedance, and means for varying said bias in response to variations in the output of said detector.

References Cited in the file of this patent

UNITED STATES PATENTS

| | | |
|---|---|---|
| 2,479,650 | Tiley | Aug. 23, 1949 |
| 2,654,863 | Riblet | Oct. 6, 1953 |